United States Patent [19]

Cheng

[11] Patent Number: 5,477,747
[45] Date of Patent: Dec. 26, 1995

[54] PIVOT ARM ASSEMBLY FOR HANDLEBAR

[75] Inventor: Tien-chu Cheng, Taichung Hsien, Taiwan

[73] Assignee: Kalloy Industrial Co., Ltd., Taichung Hsien, Taiwan

[21] Appl. No.: 320,222

[22] Filed: Oct. 11, 1994

[51] Int. Cl.⁶ .................................................. B62K 21/12
[52] U.S. Cl. .................. 74/551.1; 74/551.3; 280/279; 403/374
[58] Field of Search ........................... 74/551.1–551.8; 280/276, 279; 403/374

[56] References Cited

U.S. PATENT DOCUMENTS

| | | | |
|---|---|---|---|
| 4,354,399 | 10/1982 | Katayama | 74/551.1 |
| 5,095,770 | 3/1992 | Rader | 74/551.3 |
| 5,201,242 | 4/1993 | Chi | 403/370 X |
| 5,251,494 | 10/1993 | Edwards | 280/279 X |
| 5,297,445 | 3/1994 | Chen | 74/551.8 |
| 5,299,467 | 4/1994 | Marui | 280/279 X |
| 5,408,900 | 4/1995 | Marui | 74/551.4 |

FOREIGN PATENT DOCUMENTS

| | | | |
|---|---|---|---|
| 426224 | 7/1911 | France | 74/551.1 |
| 572258 | 6/1924 | France | 74/551.1 |
| 2416156 | 10/1979 | France | 74/551.1 |

*Primary Examiner*—Vinh T. Luong
*Attorney, Agent, or Firm*—Bacon & Thomas

[57] ABSTRACT

A pivot arm assembly secures a handlebar to a steerer tube and includes a shank having a sleeve for engaging with the steerer tube. The shank has a lateral aperture communicating with the cylindrical opening of the sleeve. Two clampers and a fastener are engaged in the aperture. The clampers each includes a tapered surface for engaging with the tapered surfaces of the fastener so as to force the fastener to engage with the steerer tube when the clampers are forced toward each other. The fastener has an embossed surface for solidly engaging with the steerer tube.

2 Claims, 3 Drawing Sheets

5,477,747

PIVOT ARM ASSEMBLY FOR HANDLEBAR

BACKGROUND OF THE INVENTION (a) Field of the Invention

The present invention relates to a pivot arm assembly, and more particularly to a pivot arm assembly for securing a handlebar to the steerer tube of a bicycle.

(b) Description of the Prior Art

Typical pivot arms are provided for securing handlebars to the steerer tubes so as to control steering operation of the bicycles. Such pivot arms include a shank having a sleeve formed on one end for securing the handlebar and having another sleeve formed on the other end for securing to the steerer tube. However, normally, the other sleeves are simply loosely engaged on the steerer tubes and are secured in place by bolts which engage with the steerer tubes for applying clamping force to the sleeves so as to maintain the sleeves in place. The pivot arms may not be solidly secured in place.

The present invention has arisen to mitigate and/or obviate the afore-described disadvantages of the conventional pivot arms for handlebars.

SUMMARY OF THE INVENTION

The primary objective of the present invention is to provide a pivot arm assembly which solidly secures the handlebar to the steerer tube.

In accordance with one aspect of the present invention, there is provided a pivot arm assembly for securing a handlebar to a steerer tube. The pivot arm assembly comprises a shank including a first end having a connector provided thereon and a second end having a sleeve provided thereon for securing to the steerer tube, the sleeve including a cylindrical opening for engaging with the steerer tube, the shank including an aperture laterally formed therein close to the sleeve and communicating with the cylindrical opening of the sleeve, two clamping members and a fastener are engaged in the aperture, the fastener being engaged between the clamping members and including two first tapered surfaces and including an orifice formed therein, the clamping members each including a screw hole formed therein and each including a second tapered surface for engaging with the first tapered surfaces of the fastener so as to force the fastener toward the steerer tube when the clamping members move toward each other, the fastener including an active surface for engaging with the steerer tube, and the active surface including an embossed surface for solidly engaging with the steerer tube, and bolt means engaged with the screw holes of the clamping members and engaged through the orifice so as to force the clamping members toward each other in order to force the fastener to clamp the steerer tube in place, the embossed surfaces of the fastener further solidly securing the steerer tube in place.

The shank includes a hollow interior, the aperture is in communication with the cylindrical opening of the sleeve and communicates with the hollow interior of the shank, the pivot arm assembly further comprises a semi-cylindrical partition member engaged in the aperture, the partition member includes stop means for engaging with the shank so as to prevent the partition member from rotating relative to the shank and, the clamping members are slidably engaged with the partition member.

The partition member includes two longitudinal edges, the clamping members and the fastener each includes two shoulders for slidably engaging with the longitudinal edges of the partition member such that the clamping members and the fastener are guided to slide along the partition member and are prevented from rotating relative to the partition member.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
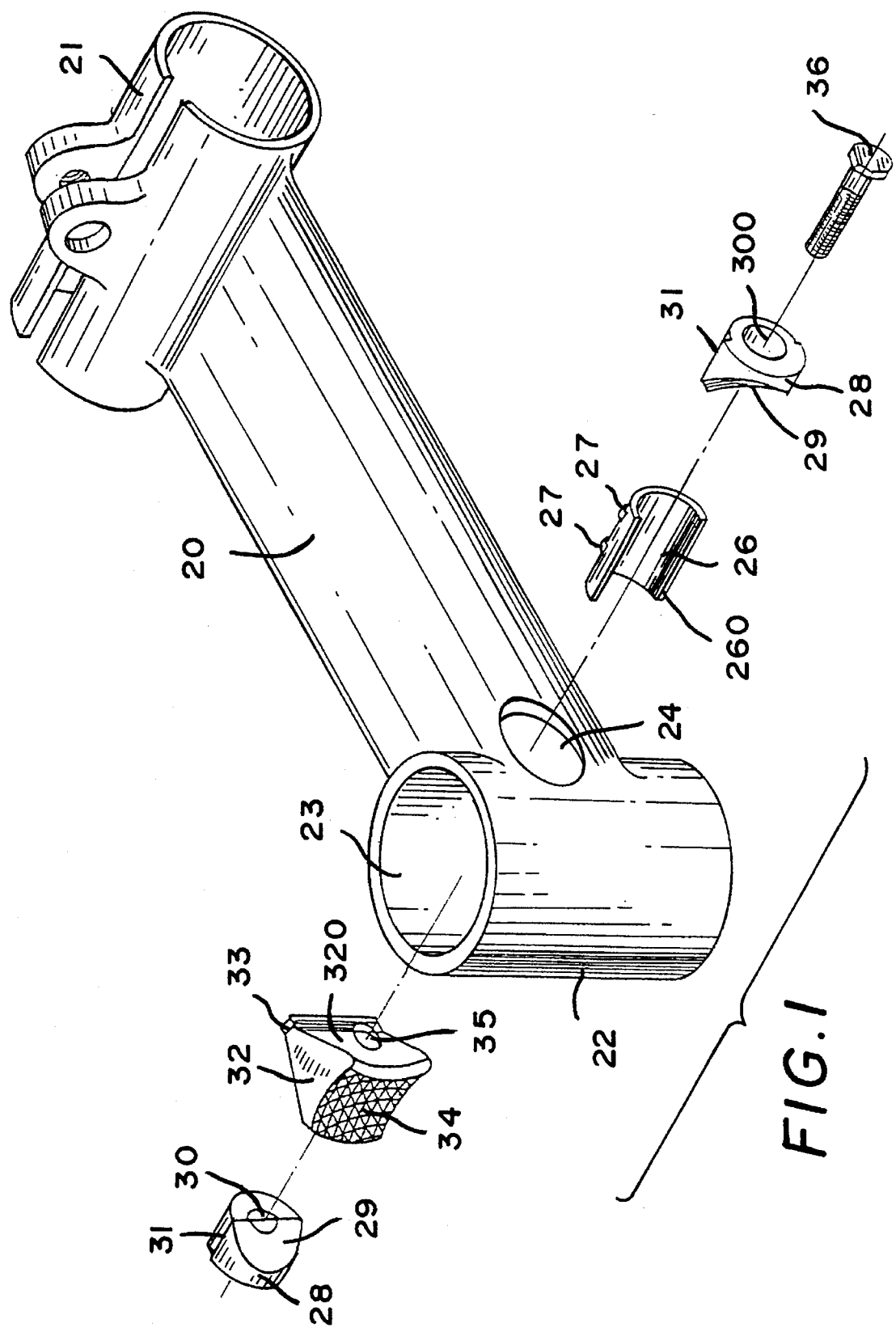
FIG. 1 is an exploded perspective view of a pivot arm assembly for a handlebar in accordance with the present invention.
Figure 2:
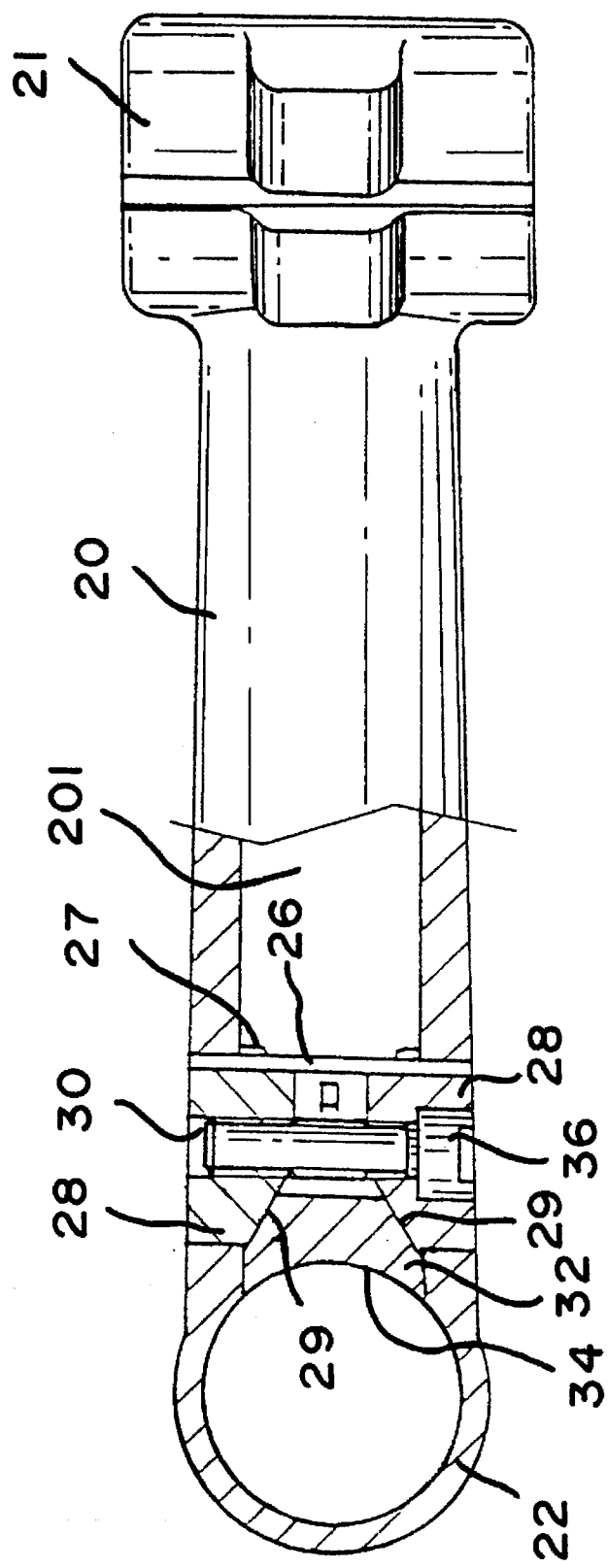
FIGS. 2 and 3 are partial cross sectional views illustrating the operations of the pivot arm assembly.

Referring to the drawings and initially to FIGS. 1 and 2, a pivot arm assembly in accordance with the present invention comprises a shank 20 including a hollow interior 201, a connector 21 formed on one end thereof for engaging with and for supporting a handlebar, and including a sleeve 22 having a cylindrical opening 23 formed therein for engaging with a steerer tube 25 (FIG. 3) so as to secure the handlebar to the steerer tube 25. The primary structure of the pivot arm assembly is disclosed in a co-pending U.S. patent application Ser. No. 08/194,419, filed on Feb. 10, 1994 now U.S. Pat. No. 5,437,208; which can be used as a reference of the present application.

Figure 3:
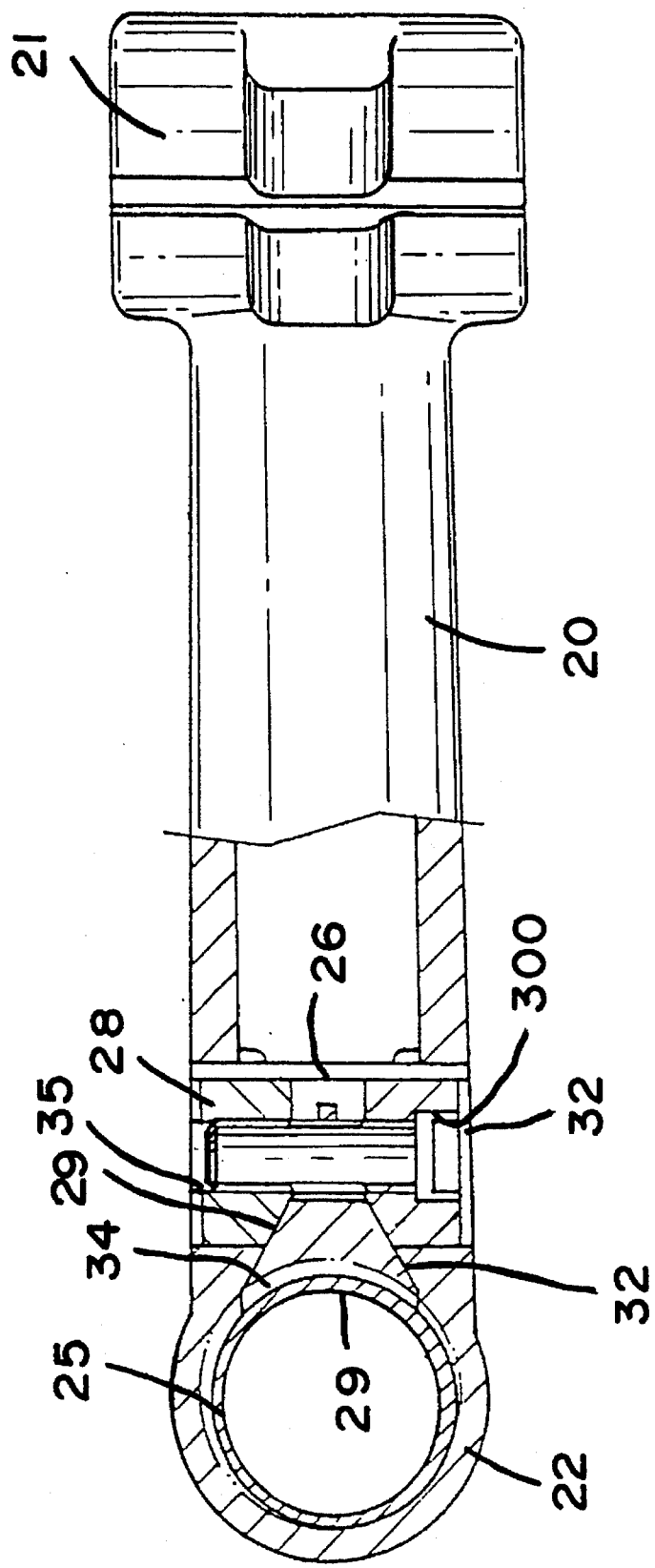

The shank 20 includes an aperture 24 laterally formed therein close to the sleeve 22 and communicating with both the cylindrical opening 23 of the sleeve 22 and the hollow interior 201 of the shank 20 as shown in FIGS. 2 and 3. A partition member 26 of semi-cylindrical shape is engaged in the aperture 24 so as to form the wall member of the aperture 24. The partition member 26 includes two stop members 27 formed on the outer surface for engaging with the inner peripheral surface of the shank 20 so as to prevent the partition member 26 from rotating movement.

Two cylindrical clamping members 28 and a fastener 32 are engaged in the aperture 24. The cylindrical clamping members 28 each includes a threaded hole 30 formed therein for engagement with a bolt 36 which is rotated in either direction so as to move the clamping members 28 toward or away from each other, and each includes a tapered surface 29. The fastener 32 includes two tapered side surfaces 320 for engaging with the tapered side surfaces 29 of the clamping members 28. The fastener 32 may be forced toward the steerer tube 25 when the clamping members 28 are forced toward each other by the bolt 36. The fastener 32 includes a passageway 35 for receiving with the bolt 35, the passageway 35 having a larger size than that of the bolt 36 so as to allow relative movement between the fastener 32 and the bolt 36 when the fastener 32 is moved toward the steerer tube 25. One of the clamping members 28 includes an enlarged recess 300 for receiving the head of the bolt 36. The fastener 32 includes an acting surface 34 for engaging with the steerer tube 25, and surface 34 includes embossing thereon for increasing friction for solidly clamping the steerer tube 25 and for solidly securing the shank 20 to the steerer tube 25.

The cylindrical clamping members 28 each includes a pair of shoulders 31, and the fastener 32 includes a pair of shoulders 33 for engaging with two longitudinal edges 260 of the partition member 26 so as to prevent the cylindrical clamping members 28 and the fastener 32 from rotating relative to the partition member 26 and for guiding the cylindrical clamping members 28 and the fastener 32 to move longitudinally along the partition member 26.

In operation, the clamping members 28 are forced toward each other so as to force the fastener 32 to engage with the steerer tube 25 and secure the steerer tube 25 in place when the bolt 36 is rotated in one direction. The shank 20 may thus be solidly secured to the steerer tube. The embossed acting surface 34 further secures the clamping members 28 to the steerer tube 25 such that the shank 20 may further be solidly secured to the steerer tube 25.

Accordingly, the pivot arm assembly in accordance with the present invention may be solidly secured to the steerer tube such that the handlebar may also be solidly secured to the steerer tube.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pivot arm assembly for securing a handlebar to a steerer tube of a bicycle, the assembly comprising:

a) a shank including a hollow interior, a first end provided with a connector for engaging a handlebar and a second end provided with a sleeve for engaging a steerer tube, the sleeve including a cylindrical opening for receiving the steerer tube, and the shank including an aperture laterally formed therein, the aperture being disposed adjacent the sleeve and in communication with both the hollow interior and the cylindrical opening;

b) two clamping members and a fastener engageable within the aperture, the fastener being disposable between the two clamping members and including a passageway formed therethrough, two first tapered surfaces and an embossed surface for engaging the steerer tube, each clamping member including a threaded hole formed therein and a second tapered surface, each first tapered surface being engageable by a second tapered surface;

c) a semi-cylindrical partition member engageable within the aperture, the partition member including stop means for engagement with the shank to prevent the partition member from rotating relative to the shank, the clamping members being slidably engageable with the partition member; and d) bolt means for threaded engagement with the threaded holes of the clamping members and extendable through the passageway of the fastener for forcing the clamping members toward each other and the fastener into clamping engagement with the steerer tube during rotation of the bolt means.

2. The pivot arm assembly of claim 1 wherein the partition member further includes two longitudinal edges, the clamping members and the fastener each includes two shoulders for slidable engagement with the longitudinal edges of the partition member to guide the clamping members and fastener along the partition member and prevent the clamping members and the fastener from rotating relative to the partition member.

\* \* \* \* \*